(12) United States Patent
Langenfeld et al.

(10) Patent No.: US 8,007,010 B2
(45) Date of Patent: *Aug. 30, 2011

(54) HYDRAULIC LINE ATTACHMENT DEVICE AND METHOD

(75) Inventors: Joseph W. Langenfeld, Onawa, IA (US); Matthew N. Westendorf, Onawa, IA (US); Neal W. Westendorf, Dakota Dunes, SD (US); James Curtis Stender, Schleswig, IA (US); Mitch Gibler, Onawa, IA (US)

(73) Assignee: Westendorf Manufacturing Co., Inc., Onawa, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/658,574

(22) Filed: Feb. 4, 2010

(65) Prior Publication Data

US 2010/0148494 A1 Jun. 17, 2010

Related U.S. Application Data

(62) Division of application No. 11/397,863, filed on Apr. 3, 2006, now Pat. No. 7,717,471, which is a division of application No. 10/773,566, filed on Feb. 6, 2004, now Pat. No. 7,021,668.

(51) Int. Cl.
*F16L 35/00* (2006.01)
(52) U.S. Cl. ............ 285/38; 285/124.4; 285/124.1
(58) Field of Classification Search ............ 285/38, 285/124.5, 124.4, 124.1, 29, 402, 12.1, 19, 285/361, 396; 403/349, 348; 37/466; 248/222.13, 248/231.31, 229.21
See application file for complete search history.

(56) References Cited

U.S. PATENT DOCUMENTS

| | | | |
|---|---|---|---|
| 2,326,338 A | 8/1943 | Drott et al. | |
| 2,788,991 A | 4/1957 | Neuhauser | |
| 2,812,595 A | 11/1957 | Drott et al. | |
| 3,077,999 A | 2/1963 | Svoboda | |
| 3,209,474 A | 10/1965 | Artman | |

(Continued)

FOREIGN PATENT DOCUMENTS

GB 130418 8/1919

OTHER PUBLICATIONS

"FASTER® Multifaster Series," 12 Pages, Date Unknown.

(Continued)

*Primary Examiner* — Aaron Dunwoody
(74) *Attorney, Agent, or Firm* — Merchant & Gould, P.A.

(57) ABSTRACT

A hydraulic line attachment device is provided. The hydraulic line attachment device comprises a first assembly comprising a first frame constructed for holding a plurality of first hydraulic line couplers and a first coupling member; and a second assembly comprising a second frame constructed for holding a plurality of second hydraulic line couplers and a second coupling member constructed to engage the first coupling member and align the plurality of first hydraulic line couplers with the plurality of second hydraulic line couplers. At least one of the first coupling member and the second coupling member comprises an arm constructed to engage at least one of the first frame and the second frame and engage the other of the first coupling member and the second coupling member. The other of the first coupling member and the second coupling member comprises a cam that engages the arm to provide tightening of the first assembly relative to the second assembly. A method for using a hydraulic line attachment device is provided.

14 Claims, 10 Drawing Sheets

U.S. PATENT DOCUMENTS

| | | | |
|---|---|---|---|
| 3,243,905 A | 4/1966 | Ulrich | |
| 3,344,540 A | 10/1967 | Ulrich | |
| 3,455,477 A | 7/1969 | Blair | |
| 3,512,665 A | 5/1970 | Westendorf | |
| 3,701,443 A | 10/1972 | Lely | |
| 3,991,890 A | 11/1976 | Frank | |
| 4,033,469 A | 7/1977 | Frank | |
| 4,051,962 A | 10/1977 | Westendorf | |
| 4,085,856 A | 4/1978 | Westendorf | |
| 4,345,870 A | 8/1982 | Anderson et al. | |
| 4,538,955 A | 9/1985 | Langenfeld et al. | |
| 4,565,485 A | 1/1986 | Wilman | |
| 4,566,844 A | 1/1986 | Campin | |
| 4,606,692 A | 8/1986 | Langenfeld et al. | |
| 4,611,831 A | 9/1986 | Truchet | |
| 4,787,811 A | 11/1988 | Langenfeld et al. | |
| 4,790,084 A | 12/1988 | Anderson et al. | |
| 4,797,051 A | 1/1989 | Langenfeld et al. | |
| 4,859,130 A | 8/1989 | Langenfeld et al. | |
| 4,890,400 A | 1/1990 | Long | |
| 4,915,575 A | 4/1990 | Langenfeld et al. | |
| 4,930,974 A | 6/1990 | Langenfeld et al. | |
| 4,968,213 A | 11/1990 | Langenfeld et al. | |
| 4,995,760 A | 2/1991 | Probst et al. | |
| 5,121,557 A | 6/1992 | Moore | |
| 5,316,347 A | 5/1994 | Arosio | |
| 5,333,691 A * | 8/1994 | Dean et al. | 166/341 |
| 5,387,076 A | 2/1995 | Fuzzen | |
| 5,417,459 A | 5/1995 | Gray et al. | |
| 5,466,113 A | 11/1995 | Norberg | |
| 5,507,530 A | 4/1996 | Mahaney | |
| 5,785,328 A | 7/1998 | Eckloff | |
| 5,984,371 A | 11/1999 | Mailleux | |
| 5,997,237 A | 12/1999 | Langenfeld et al. | |
| 6,142,724 A | 11/2000 | Hirooka et al. | |
| 6,453,945 B1 * | 9/2002 | Schumacher et al. | 137/614.06 |
| 6,578,296 B2 | 6/2003 | Kimoto et al. | |
| 6,582,177 B1 | 6/2003 | Westendorf et al. | |
| 6,595,552 B1 | 7/2003 | Mortari | |
| 6,663,337 B2 | 12/2003 | Westendorf et al. | |
| 7,021,668 B2 | 4/2006 | Langenfeld et al. | |

OTHER PUBLICATIONS

Singleline; Cejn AB Sep. 19, 2007; 8 pages.

Letter from Arne Cederquist dated Mar. 14, 2007; 1 page

Opinion Concerning the Validity of US 7 021 668 to Langenfeld et. al. By Timothy Platt; dated Mar. 14, 2007; 6 pages.

Replacement Statement and Explanation filed in Reexamination Application (Control No. 95/000,371), concerning U.S. Patent 7,021,668 to Langenfeld et. al., mailed Jun. 26, 2008 (18 pages).

Amendment and Response In *Inter Partes* Reexamination Communication (Control No. 95/000,371); concerning U.S. Patent 7,021,668 to Langenfeld et al., dated Nov. 13, 2008.

Requestor Comments on Applicant's Response In *Inter Partes* Reexamination Communication (Control No. 95/000,371); concerning U.S. Patent 7,021,668 to Langenfeld et al., dated Nov. 27, 2008.

Office Action In *Inter Partes* Reexamination Communication (Control No. 95/000,371); concerning U.S. Patent 7,021,668 to Langenfeld et al., dated Mar. 23, 2009.

Amendment and Response In *Inter Partes* Reexamination Communication (Control No. 95/000,371); concerning U.S. Patent 7,021,668 to Langenfeld et al., dated Apr. 23, 2009.

Requestor's Comments on Applicant's Response, In *Inter Partes* Reexamination Communication (Control No. 95/000,371); concerning U.S Patent 7,021,668 to Langenfeld et al., dated May 6, 2009.

Right of Appeal Notice In *Inter Partes* Reexamination Communication (Control No. 95/000,371); concerning U.S. Patent 7,021,668 to Langenfeld et al., dated May 27, 2009.

Appeal Brief In *Inter Partes* Reexamination Communication (Control No. 95/000,371); concerning U.S. Patent 7,021,668 to Langenfeld et al., dated Aug. 26, 2009 (without exhibits).

Requester Comments on Appellant's Appeal Brief In *Inter Partes* Reexamination Communication (Control No. 95/000,371); concerning U.S. Patent 7,021,668 to Langenfeld et al., dated Sep. 18, 2009.

Office Action In *Inter Partes* Reexamination Communication (Control No. 95/000,371); concerning U.S. Patent 7,021,668 to Langenfeld et al., dated Sep. 23, 2008 (30 pages).

Order Granting,/Deying Request for In *Inter Partes* Reexamination Communication (Control No. 95/000,371); concerning U.S. Patent 7,021,668 to Langenfeld et al., dated Sep. 23, 2008 (18 pages).

Requester Comments on Patent Owners Statement and Claim Amendments (Control No. 95/001,446), dated Feb. 16, 2011.

Action Closing Prosecution (Control No. 95/001,446), dated Jun. 9, 2011.

Notification re Brief; Reexamination Application (Control No. 95/000,371), dated Feb. 2, 2010.

Amended Respondent Brief; Reexamination Application (Control No. 95/000,371), dated Feb. 25, 2010.

Appellant's Amended Appeal Brief; Reexamination Application (Control No. 95/000,371), dated Mar. 3, 2010.

Amendment Under 37 C.F.R. § 1.530(d); Reexamination Application (Control No. 95/000,371), dated Mar. 3, 2010.

Examiner's Answer, Reexamination Application (Control No. 95/000,371), dated Apr. 2, 2010.

Decision on Appeal; Reexamination Application (Control No. 95/000,371), dated Dec. 17, 2010.

Request for Inter Partes Re-examination, Reexamination Application (Control No. 95/001,446), dated Sep. 17, 2010.

Order Granting/Denying Request for Inter Partes Re-examination, Reexamination Application (Control No. 95/001,446), dated Nov. 16, 2010.

Office Action in Inter Partes Re-examination, Reexamination Application (Control No. 95/001,446), dated Nov. 16, 2010.

Patent Owners Statement and Amendment Under 37 C.F.R. § 1.530, Reexamination Application (Control No. 95/001,446), dated Jan. 18, 2011.

\* cited by examiner

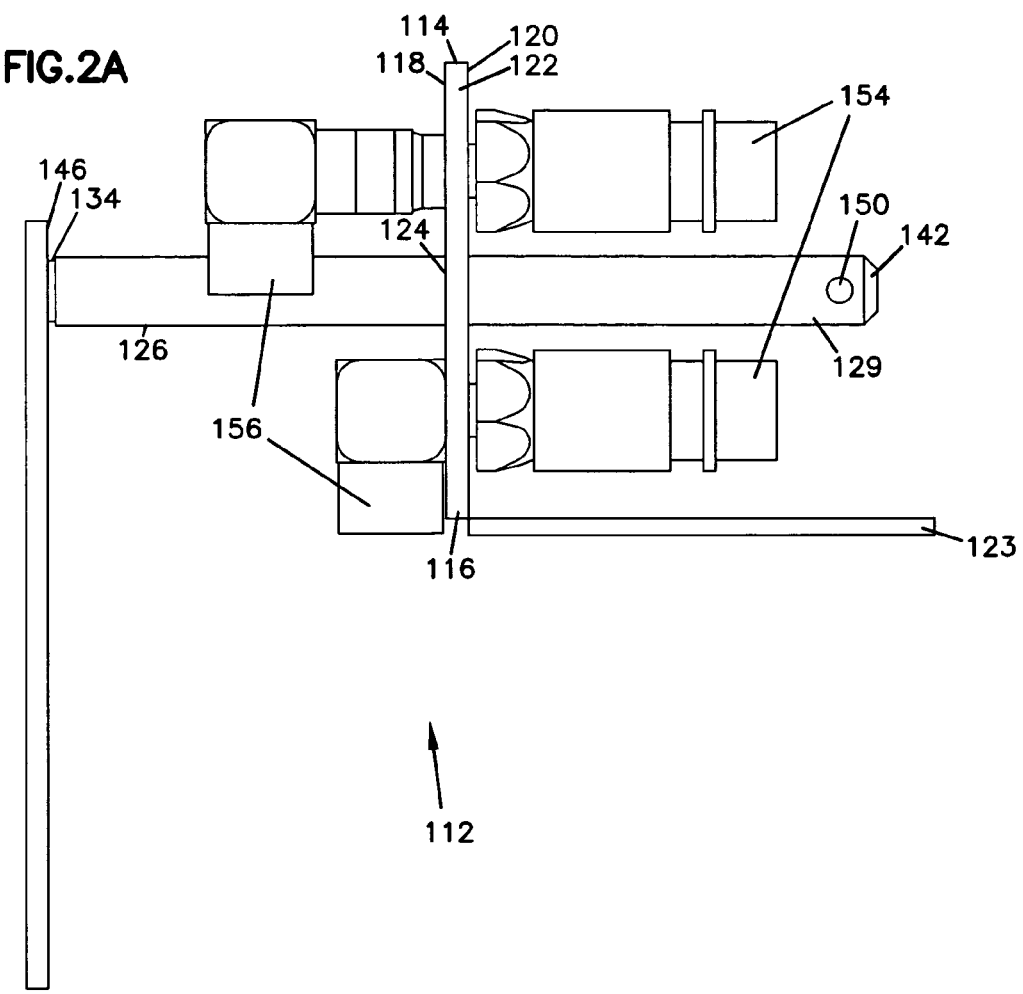
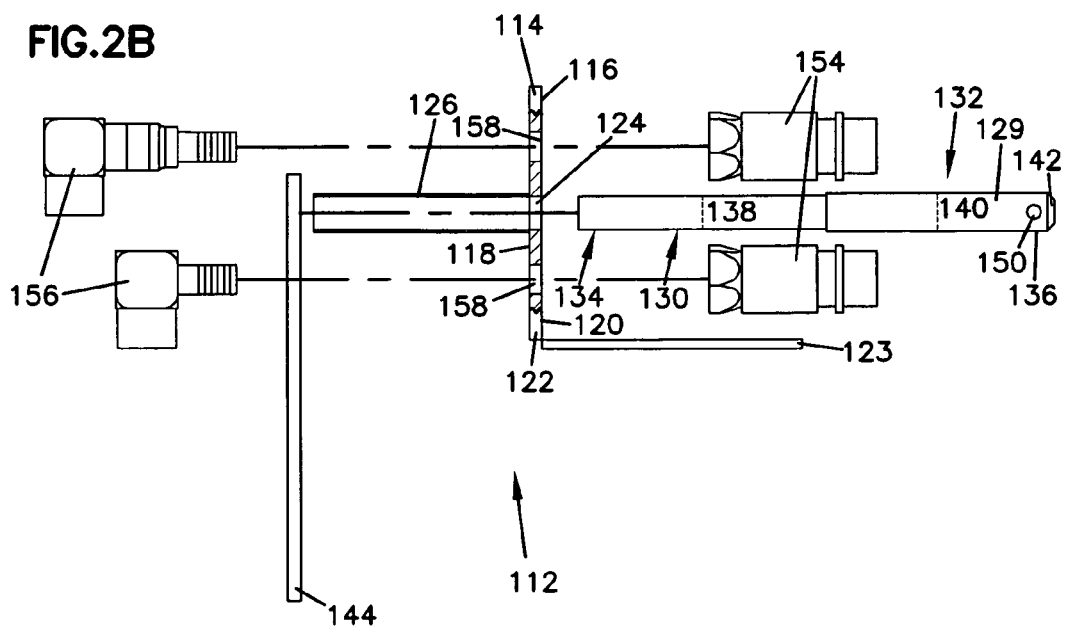

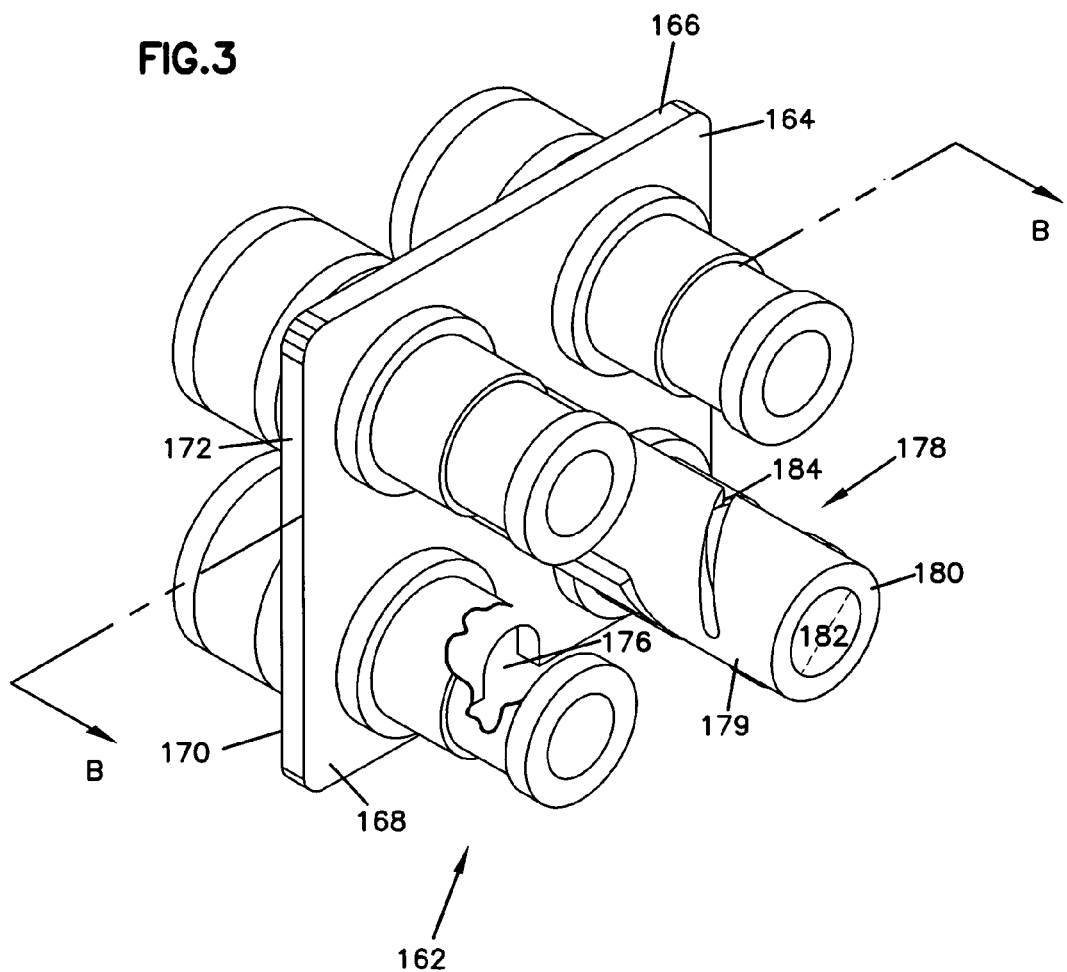

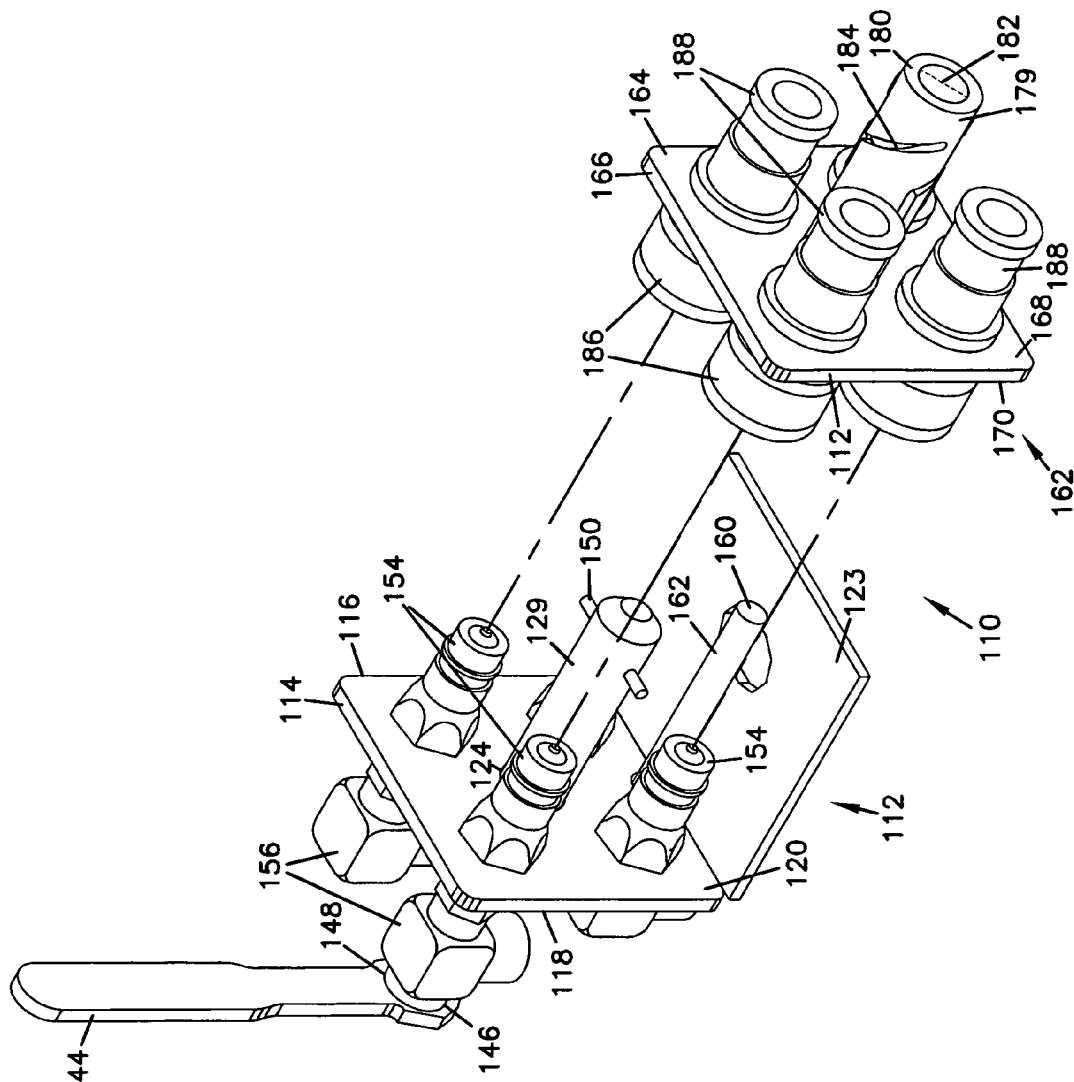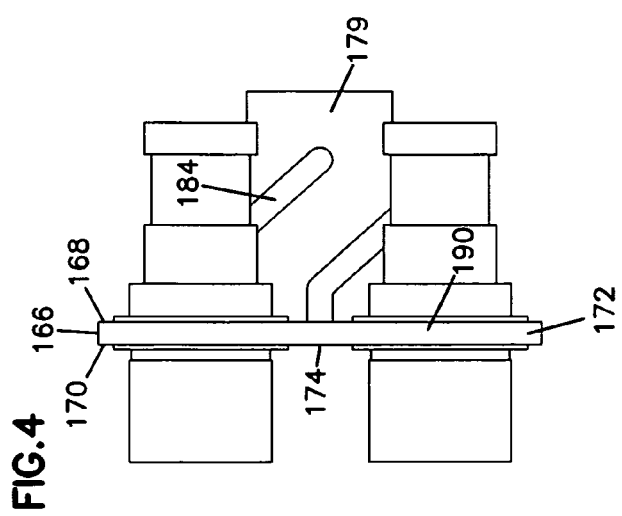

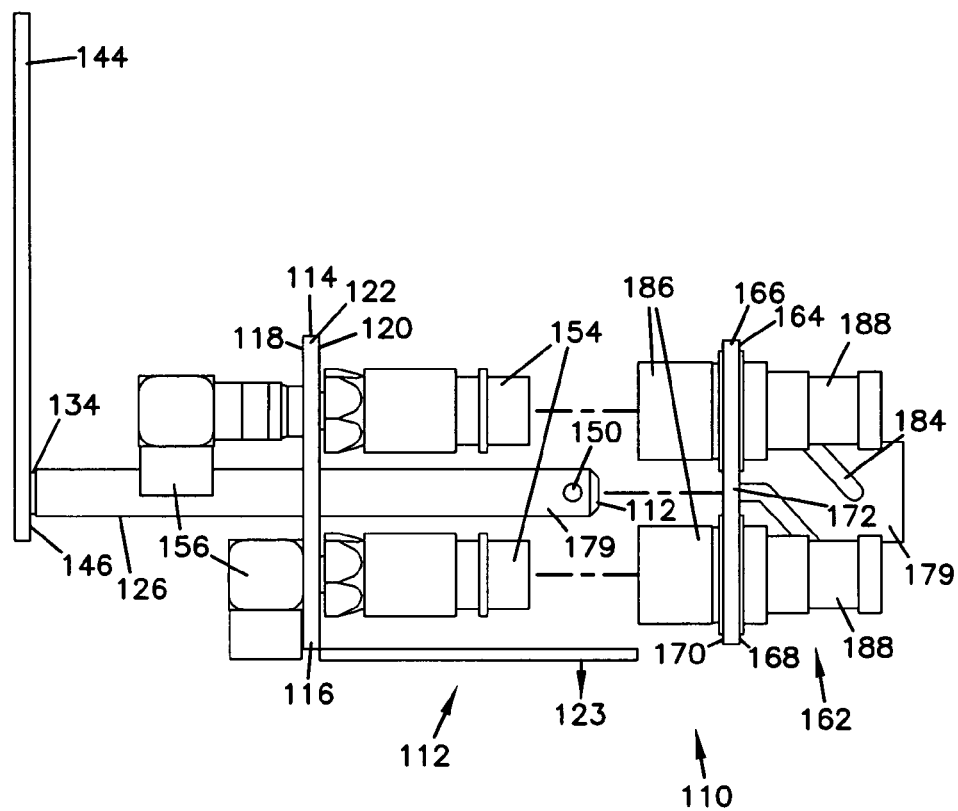
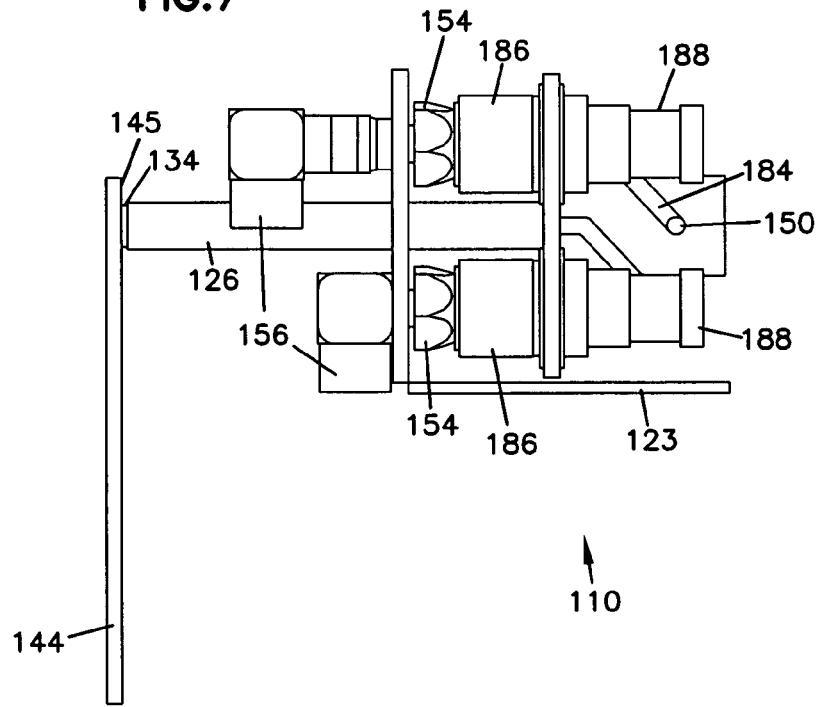

HYDRAULIC LINE ATTACHMENT DEVICE AND METHOD

CROSS REFERENCE TO RELATED APPLICATIONS

This application is a divisional of U.S. application Ser. No. 11/397,863 that was filed on Apr. 3, 2006 which is a divisional of U.S. application Ser. No. 10/773,566 that was filed on Feb. 6, 2004 and that issued as U.S. Pat. No. 7,021,668 on Apr. 4, 2006. The entire disclosures of U.S. application Ser. Nos. 11/397,863 and 10/773,566 are incorporated herein by reference.

FIELD OF THE INVENTION

The invention relates to a hydraulic line attachment device and a method for using a hydraulic line attachment device. The hydraulic line attachment device uses two assemblies, one of which is fixedly mounted to an environment using hydraulic lines to power hydraulic cylinders and the other one movable including a handle to facilitate the relative movement thereof and to attach the movable assembly to the fixedly mounted assembly to attach the hydraulic lines.

BACKGROUND OF THE INVENTION

Hydraulic lines for powering hydraulic cylinders can be found on a number of environments. Frequently, where hydraulic cylinders are found, hydraulic lines have been clustered for quick and easy attachment and detachment. One example of an environment where clusters of hydraulic lines to power hydraulic cylinders are frequently found is a front-end loader. Typical front-end loaders have a pair of boom assemblies that have rearward ends that pivotally attach to a tractor, and forward ends that pivotally attach to buckets, clam shells, plow, fork lifts, bale spears, etc. Hydraulic cylinders are provided for operating the front-end loaders and the attachments. Some exemplary front end loaders using hydraulic lines to power hydraulic cylinders are described by U.S. Pat. No. 3,512,665 to Westendorf; U.S. Pat. No. 4,085, 856 to described by U.S. Pat. No. 3,512,665 to Westendorf; U.S. Pat. No. 4,085,856 to Westendorf; U.S. Pat. No. 4,787, 811 to Langenfeld et al.; U.S. Pat. No. 4,051,962 to Westendorf; U.S. Pat. No. 4,606,692 to Langenfeld et al.; and U.S. Pat. No. 4,930,974 to Langenfeld et al., the disclosures of which are all incorporated herein by reference.

There have been efforts made to attach clusters of hydraulic lines more effectively, more quickly, and with less effort, one example being provided by the company, Faster®. The present invention is part of the continuing effort.

SUMMARY OF THE INVENTION

A hydraulic line attachment device is provided according to the invention. The hydraulic line attachment device includes a first assembly and a second assembly. The first assembly includes a frame for holding first hydraulic line couplers and a first coupling member. The second assembly includes a second frame for holding second hydraulic couplers and a second coupling member. The second coupling member is constructed to engage the first coupling member and align the first hydraulic line couplers with the second hydraulic line couplers. At least one of the first coupling member and the second coupling member includes an arm that is constructed to engage at least one of the first frame and the second frame and also engage the other coupling member. The other coupling member includes a cam that engages the arm to provide tightening of the two assemblies together A method for attaching a first set of hydraulic lines to a second set of hydraulic lines is provided according to the invention. The method includes the step of connecting a plurality of first hydraulic line couplers to a plurality of second hydraulic line couplers by connecting two assemblies. Each assembly includes a frame for holding hydraulic line couplers and for holding a coupling member. The coupling members are constructed for engaging each other and aligning the two sets of hydraulic line couplers. At least one of the two coupling members includes an arm that is constructed to engage at least one of the two frames and also engage the other coupling member. The other coupling member includes a cam that engages the arm to tighten the two assemblies together for attaching the hydraulic lines.

BRIEF DESCRIPTION OF THE DRAWINGS

FIG. 2A is a side view of the first assembly of the hydraulic line attachment device of FIG. 1;

FIG. 2B is an exploded side view of the first assembly of the hydraulic line attachment device of FIGS. 1 and 2A;

FIG. 3 is an isolated perspective view of a second assembly of the hydraulic line attachment device according to the principles of the present invention;

FIG. 4 is a side view of the second assembly of the hydraulic line attachment device of FIG. 3;

FIG. 5 is a perspective view of the hydraulic line attachment device according to the principles of the present invention, illustrating the first assembly of FIGS. 1 and 2 and the second assembly of FIGS. 3 and 4 in an unengaged position;

FIG. 6 is a side view of the hydraulic line attachment device according to the principles of the present invention, illustrating the first assembly of FIGS. 1 and 2 and the second assembly of FIGS. 3 and 4 in an unengaged position;

FIG. 7 is a side view of the hydraulic line attachment device according to the principles of the present invention, illustrating the first assembly of FIGS. 1 and 2 and the second assembly of FIGS. 3 and 4 in an engaged position;

DETAILED DESCRIPTION OF THE INVENTION

This invention relates to hydraulic line attachment devices for connecting clusters of hydraulic lines. The hydraulic line attachment device can utilize a cam type arrangement to tighten two sets of clusters of hydraulic lines together. The hydraulic line attachment device can include two assemblies comprising intermating hydraulic line couplers, the assemblies constructed to be tightened to each other. A first assembly can comprise a first frame constructed for holding a plurality of first hydraulic line couplers and a first coupling member. A second assembly can comprise a second frame constructed for holding a plurality of second hydraulic line couplers and a second coupling member constructed to engage the first coupling member and align the plurality of first hydraulic line couplers with the plurality of second line couplers. In the hydraulic line attachment device, at least one of the coupling members comprises an arm constructed to engage at least one of the frames and engage the other coupling member. The other coupling member comprises a cam that engages the arm to provide tightening of the first assembly relative to the second assembly. In certain embodiments, the cam type arrangement may include an arm comprising a shaft and a cam comprising a bushing. In other embodiments, the cam type arrangement may include an arm comprising a hook member and a cam comprising a locking pin.

The invention will now be described by reference to the several drawing figures. The functional features of the invention can be embodied in any of a number of specific configurations. It will be appreciated, however, that the illustrated embodiments are provided for descriptive purposes and should not be used to limit the invention.

FIGS. 1-8 illustrate one embodiment of a hydraulic line attachment device 110 according to the principals of the present invention.

The hydraulic line attachment device 110 includes two assemblies. While it should be understood that both assemblies will be able to move relative to each other, one of the assemblies may be fixedly coupled to an environment where hydraulic cylinders are found whereas the other assembly may be movable relative to such environment. It should also be understood that both assemblies may be movable relative to an environment where hydraulic cylinders are used without being fixedly coupled.

Figure 1:
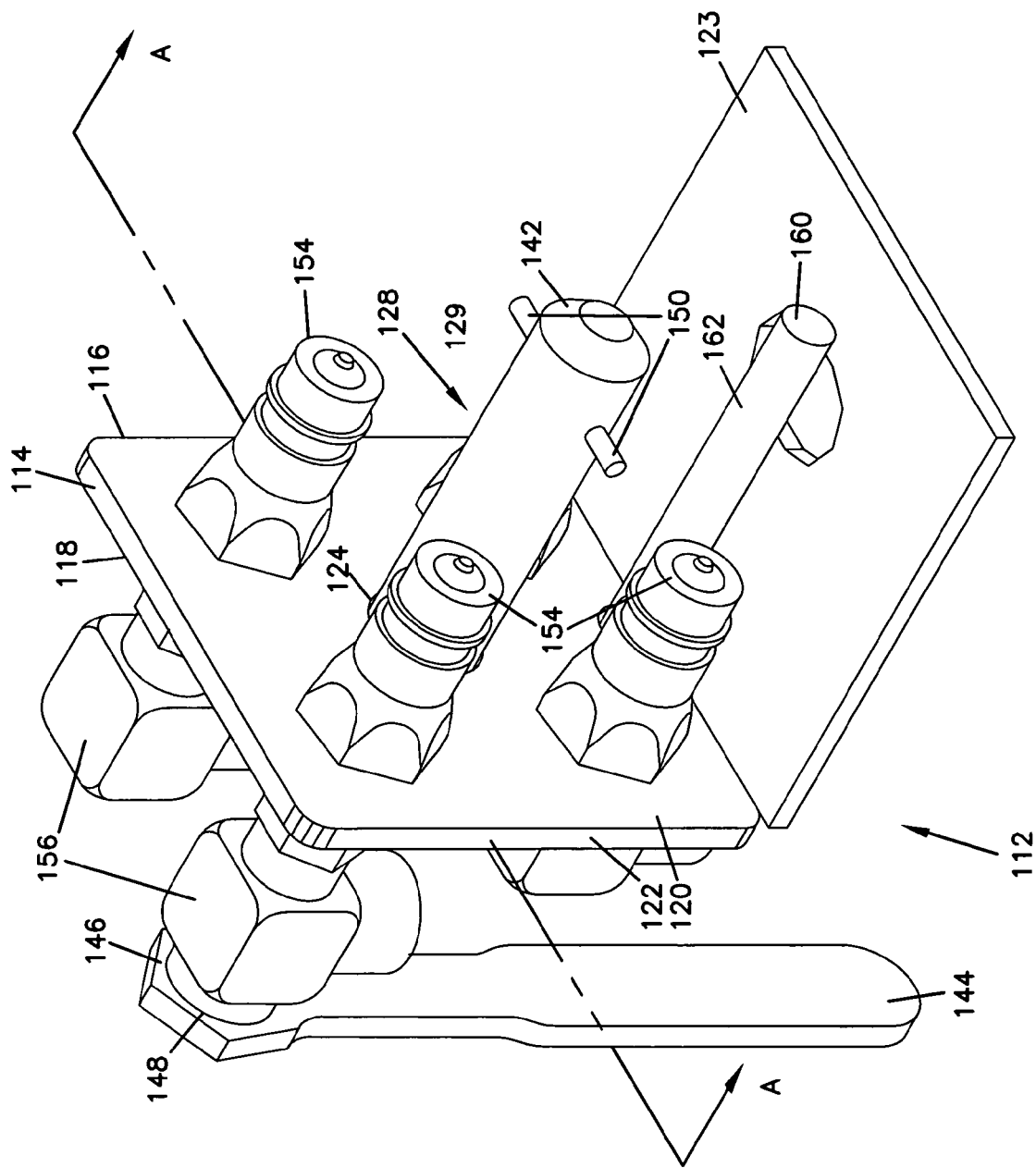
FIG. 1 is an isolated perspective view of a first assembly of a hydraulic line attachment device according to the principles of the present invention.

A first assembly of the hydraulic line attachment device 110 according to the invention is shown in FIGS. 1-2 at reference numeral 112. As shown in FIGS. 1, 2A, and 2B, the first assembly 112 includes a first frame 114 constructed for holding a plurality of hydraulic line couplers. The first frame 114 may comprise a plate 116. The plate 116 can be manufactured out of any metal. While the plate 116 is illustrated in FIGS. 1-8 to have a rectangular cross-sectional shape when taken along line A-A, the plate 116 can have any other cross-sectional shape when taken along line A-A, such as a circle, triangle, or any other polygon. The plate 116 includes an outer surface 118 and an inner surface 120. The two surfaces 118 and 120 are separated by a wall 122 of certain thickness. The thickness of the wall 122 can vary depending on the application for which it is used. The wall 122 of the plate 116 includes a circular hole 124 located in the center of the plate 116 extending through the wall 122. The first assembly 112 may also include a bracket 123 for attaching the first assembly to an environment where hydraulic cylinders are used, as illustrated in FIGS. 1, 2A, 2B, and 5-8. Although depicted as a rectangular flat piece of plate, the bracket 123 may comprise any structure coupled to the first assembly 112 configured to be used to attach the first assembly 112 to an environment where hydraulic cylinders are used.

The first assembly 112 also includes a hollow cylindrical tubular sleeve 126 coupled to outer surface 118 of the plate 116. The sleeve 126 can be manufactured out of any metal. The sleeve 126 can be coupled to the plate 116 in a number of ways including welding, threading and etc. The sleeve 126 is positioned on the plate 116 such that lies over the circular hole 124. The sleeve 126 extends out from the outer surface 118 of the plate 116 as illustrated in FIGS. 1, 2A, 2B, and 5-8.

The first assembly 112 also includes a first coupling member 128. The first coupling member 128 comprises an arm 129 depicted as a solid cylindrical shaft made up of two sections, a first section 130 and a second section 132. The first section 130 of the shaft 129 includes a first end 134 and the second section 132 of the shaft 129 includes a second end 136.

The two sections of the shaft 129 include different diameters. The diameter 138 of the first section 130 is sized to fit through the circular hole 124 and is sized such that a substantial part of the first section 130 is slidably disposed within the sleeve 126, in a rotatable manner with respect to the sleeve 126. The second section 132 of the shaft 129 extends out from the inner surface 120 as illustrated in FIGS. 1, 2A, 2B, and 5-8. The second section 132 includes a diameter 140 sized larger than the diameter 138 of the first section 130 and the circular hole 124. The second section 132, therefore, is prevented from moving transversely in a direction going from the inner surface 120 toward the outer surface 118. The second end 136 of the shaft 129 may comprise a tapering nose 142, the purpose of which will be discussed in further detail below.

As shown in FIGS. 1, 2A, 2B, and 5-8, the first assembly 112 may also include a handle 144 coupled adjacent the first end 134 of the shaft 129. The handle 144 is configured to rotate the shaft 129 within the sleeve 126. The handle 144 can be coupled to the shaft 129 in a number of ways including welding, threading, and etc. The handle 144, when coupled to the shaft 129, is configured to form a lip 146 extending outside the perimeter 148 of the sleeve 126 such that the handle 144 prevents any transverse motion of the shaft 129 in a direction going from the outer surface 118 to the inner surface 120. In this manner, the first section 130 of the shaft 129 is transversely captured between the handle 144 and the second section 132 of the shaft 129.

The second section 132 of the shaft 129 may include a roll pin 150, which is seen in FIGS. 1, 2A, 2B, and 5-8 as two generally cylindrical rods 152 extending out radially from the shaft 129 adjacent the second end 136. The roll pin 150 may be a one-piece member or may be constructed of two separate cylindrical rods extending out radially from the shaft 129. If the roll pin 150 is a one-piece member, it may be coupled to the shaft 129 by being fit within a hole extending through the second section 132 of the shaft 129. A one-piece roll pin may be coupled to the shaft 129 with a frictional fit, by welding, by threading or etc. If the roll pin 150 is made up of two pieces, the two pieces may be coupled to the opposite sides of the shaft 129 by various ways including by welding, by friction, by threading or etc. The roll pin 150 can also be configured such that only one piece extends out of the shaft 129 from one side. The function of the roll pin 150 will be described in further detail below.

As shown in FIGS. 1, 2A, 2B, and 5-8, the first assembly 112 includes a plurality of first hydraulic line couplers 154. The first hydraulic line couplers 154 extend out from the inner surface 120 of the plate 116. Although illustrated as male couplers in FIGS. 1, 2A, 2B, and 5-8, as will be evident from the disclosure, the plurality of first hydraulic line couplers 154 can also be female couplers. Moreover, though illustrated as being four in FIGS. 1, 2A, 2B and 5-8, the number of the first hydraulic line couplers 154 can vary depending on the application the hydraulic lines are used for. For example, conventional tractors with front-end loaders usually have a pair of lines for a lift cylinder and a pair of lines for an attachment cylinder. It should be understood that the term "lift cylinder" is used to describe the cylinder on the loader assembly that has the function of raising and lowering the loader assembly. It should also be understood that the term "attachment cylinder" refers to the cylinder on the loader assembly with the function of operating the attachment. Although, a minimum of four hydraulic line couplers are required for most conventional front-end loader applications, the number of couplers can vary depending upon the environment the hydraulic cylinders are used in.

The plate 116 of the first assembly 112 also includes first hydraulic line fittings 156 located on the opposite side of the wall 122 from the first hydraulic line couplers 154. The plurality of first hydraulic line couplers 154 communicate with the first hydraulic line fittings 156 through holes 158 extending through the wall 122 of the plate 116.

The first assembly 112 may also include a key rod 160 extending out from the inner surface 120 of the plate 116. The function of the key rod 160 will be discussed in further detail below. The key rod 160, as illustrated in FIGS. 1 and 5, may include an essentially elongate, solid, cylindrical shaft 162. As will be evident from the disclosure, the key rod 160 may be an elongate member having any cross-sectional shape. The key rod 160 may also be constructed as a hollow member instead of being solid. The key rod 160 may be manufactured from any metal.

A second assembly of the hydraulic line attachment device 110 according to the invention is shown in FIGS. 3, 4 at reference numeral 162. As shown in FIGS. 3, 4, the second assembly 162 includes a second frame 164 constructed for holding a plurality of hydraulic line couplers. The second frame 164 may comprise a second plate 166. The second plate 166 can be manufactured out of any metal. While the second plate 166 is illustrated to have a rectangular cross-sectional shape when taken along line B-B, the second plate 166 can have any other cross-sectional shape when taken along line B-B, such as a circle, triangle, or any other polygon. The second plate 166 includes a second outer surface 168 and a second inner surface 170. The two surfaces 168 and 170 are separated by a second wall 172 of certain thickness. The thickness of the second wall 172 can vary depending on the application for which it is used. The second wall 172 of the second plate 166 includes a second circular hole 174 located in the center of the second plate 166 extending through the second wall 172. The second wall 172 of the second plate 166 may also include a key way slot 176 shaped to receive the key rod 160 of the first assembly 112. Although, the key way slot 176 of the second assembly 162 is illustrated as having a generally semicircular shape, the key way slot 176 can include any shape which is adapted to slidably receive the key rod 160 of the first assembly 112, which, as previously discussed, can be of various shapes. The second assembly 162 may also include a bracket for attaching the second assembly to an environment where hydraulic cylinders are used, as discussed for the first assembly 112. The bracket may comprise any structure coupled to the second assembly 162 configured to be used to attach the second assembly 162 to an environment where hydraulic cylinders are used.

The second assembly 162 also includes a second coupling member 178. The second coupling member 178 comprises a cam 179 depicted as an elongate hollow bushing coupled to the second outer surface 168 of the second plate 166. The bushing 179 can be manufactured out of any metal. The bushing 179 can be coupled to the second plate 166 in a number of ways including welding, threading and etc. The bushing 179 is positioned on the second plate such that it lies over the second circular hole 174. The bushing 179 extends out from the second outer surface 168 of the second plate 166.

The bushing 179 includes a bushing wall 180 of certain thickness and an inner bushing diameter 182. The inner bushing diameter 182 is sized such that the second section 132 of the shaft 129 of the first assembly 112 can be slidably inserted into the bushing 179 and is rotatable within the bushing 179.

The thickness of the bushing wall 180 can vary depending on the bushing strength desired. The bushing wall 180 includes at least one spiral track 184 as shown in FIGS. 3-8. The spiral track 184 extends through the bushing wall 180 and is configured to slidably receive the roll pin 150 of the first assembly 112. Depending on the number of pieces of the roll pin 150 extending out of the shaft 129 of the first assembly, the number of spiral tracks 184 can vary accordingly. The length or the angle of the spiral of the track 184 can also be constructed to vary depending on the range of rotation the handle 144 of the first assembly 112 is designed to cover, the details of which will be further discussed below.

The second assembly 162 includes a plurality of second hydraulic line couplers 186. The second hydraulic line couplers 186 extend out from the second inner surface 170 of the second plate 166. Although illustrated as female couplers in FIGS. 3-8, as will be evident from the disclosure, the plurality of second hydraulic line couplers 186 can also be male couplers, the orientation of the first hydraulic line couplers 154 and the second hydraulic line couplers 186 being interchangeable. Also, as mentioned above, although illustrated as being four in FIGS. 3-8, the number of the second hydraulic line couplers 186 can vary depending on the application the hydraulic lines are used for, as long as the number of the second hydraulic line couplers 186 match the number of the first hydraulic line couplers 154.

The second plate 166 of the second assembly 162 also includes second hydraulic line fittings 188 located on the opposite side of the second wall 172 from the plurality of second hydraulic line couplers 186. The plurality of second hydraulic line couplers 186 of the second assembly 162 communicates with the second hydraulic line fittings 188 through holes 190 extending through the second wall 172 of the second plate 166.

At least one of the first assembly 112 and the second assembly 162 of the hydraulic line attachment device 110 may comprise a housing 189 for receiving the other of the first assembly 112 and the second assembly 162 therein, wherein the housing 189 is used for the purpose of concealing and providing protection for the hydraulic line couplers of the hydraulic line attachment device 110. The housing 189 is illustrated with the use of ghost lines in FIG. 8.

In using the hydraulic line attachment device 110 for attaching hydraulic lines together, the second end 136 of the second section 132 of the shaft 129 of the first assembly 112 is used to align the plurality of first hydraulic line couplers 154 with the plurality of second hydraulic line couplers 186. The tapered nose 142 of the second end 136 of the shaft 129 of the first assembly 112 is designed to easily guide the second end 136 of the shaft 129 of the first assembly 112 into the second frame 164 of the second assembly 162, wherein the second end 136 of the second section 132 of the shaft 129 of the first assembly 112 enters the bushing 179 of the second assembly 162. The key rod 160 coupled to the frame 114 of the first assembly 112, if present, may also be used to align the plurality of first hydraulic line couplers 154 with the plurality of second hydraulic line couplers 186 by slidably inserting the key rod 160 through the key way slot 176 defined on the frame 164 of the second assembly 162.

Figure 8:
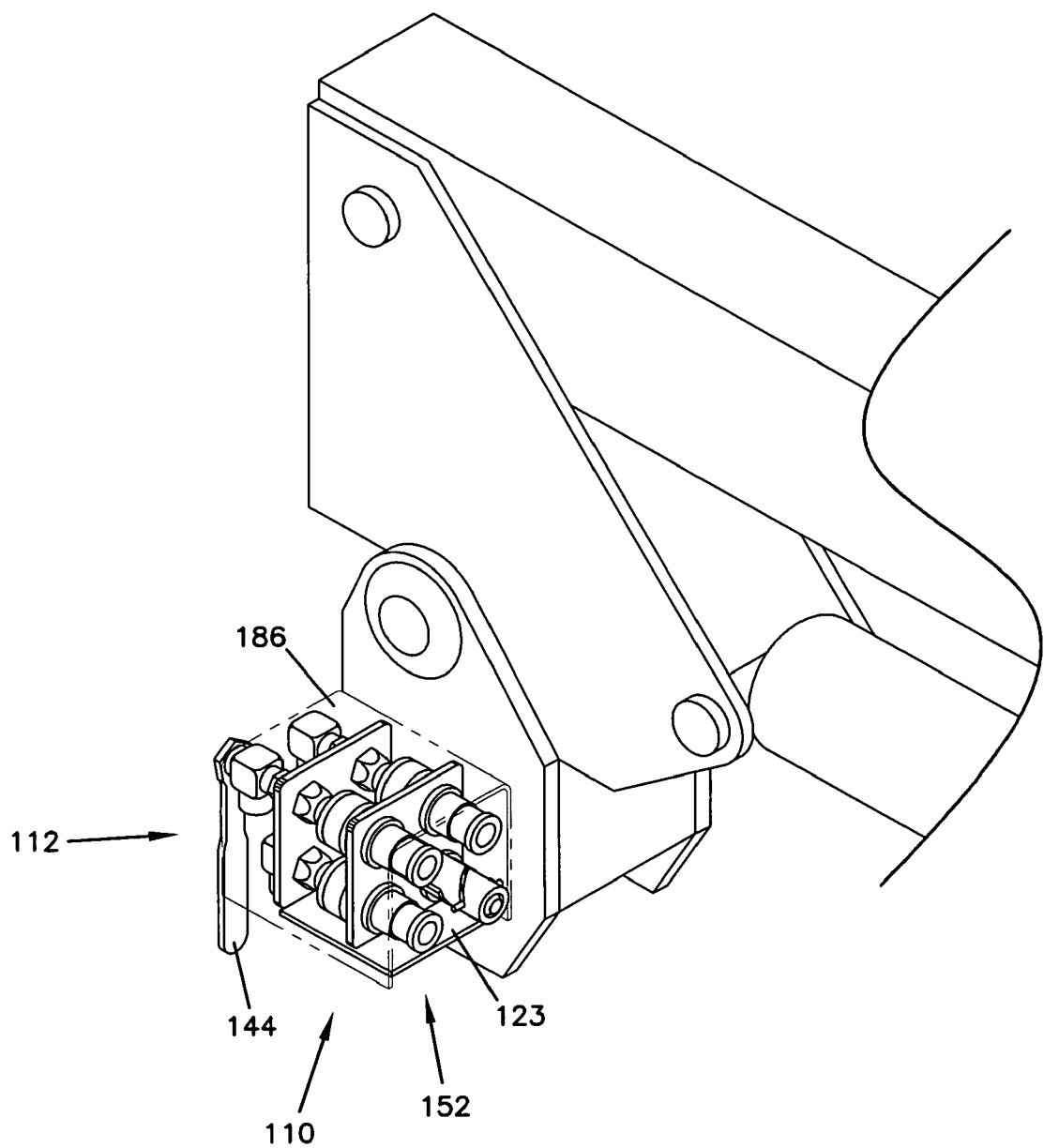
FIG. 8 is a perspective view of the hydraulic line attachment device of FIGS. 1-7, illustrated as being coupled to an environment in which hydraulic lines to power hydraulic cylinders may be used.
Figure 9:
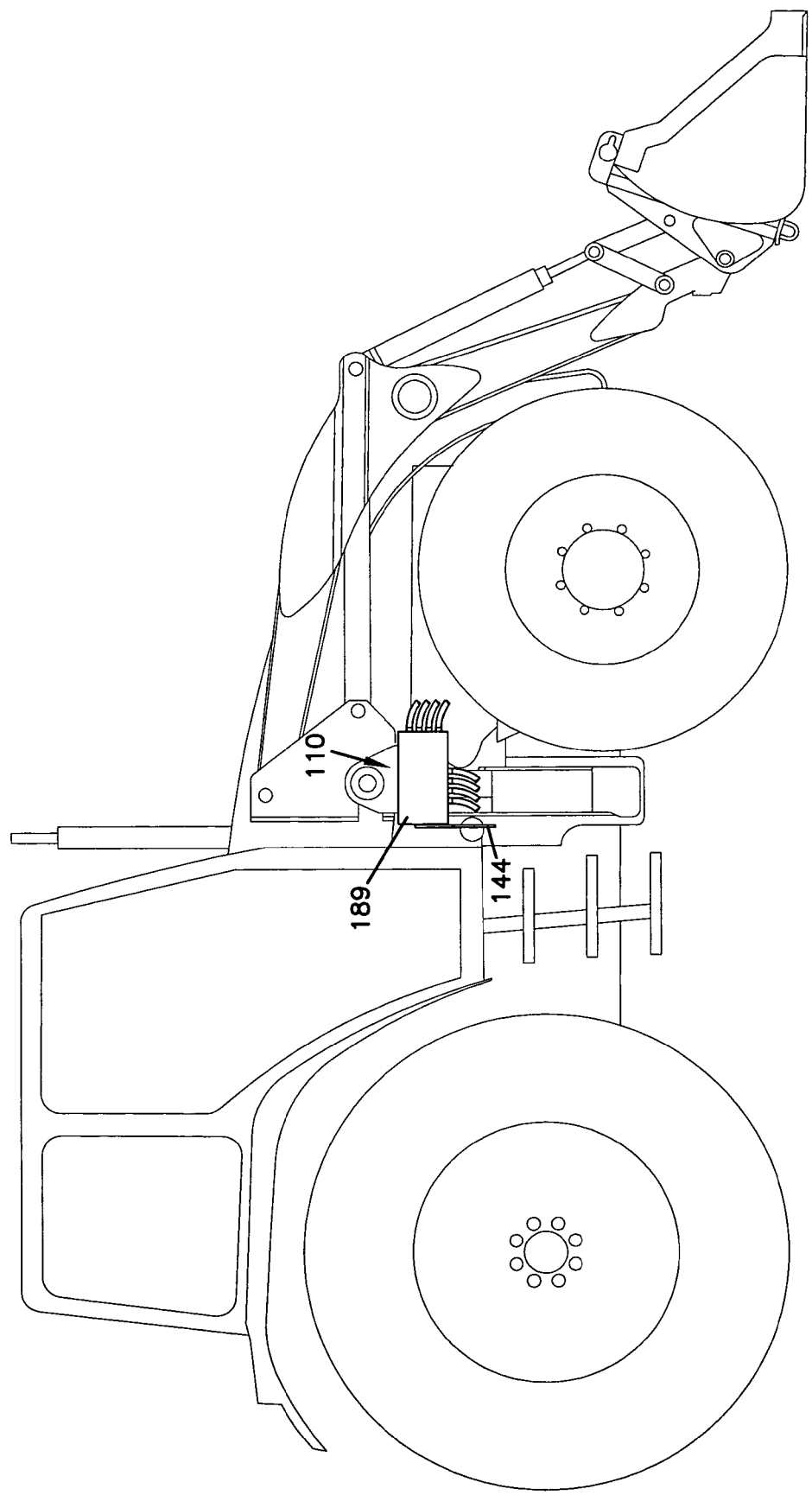
FIG. 9 is a side view of the hydraulic line attachment device of FIGS. 1-8, illustrated as being coupled to a tractor including a front-end loader.

With the handle 144 in an upright position as illustrated in FIGS. 5 and 6, the second section 132 of the shaft 129 of the first assembly 112 is slid into the bushing 179 until the roll pin 150 of the shaft 129 of the first assembly 112 enters the spiral track 184 of the bushing 179 of the second assembly 162. Once the roll pin 150 enters the spiral track 184, rotation of the handle 144 of the first assembly 112 from an upright position downwardly causes the shaft 129, along with the roll pin 150, to rotate within the bushing 179. The rotation of the roll pin 150 causes the bushing 179 to be linearly pulled toward the frame 114 of the first assembly as the rotation of the roll pin 150 is translated into a pulling force having a linear component due to the angle of the spiral track 184 defined within the bushing wall 180. As the roll pin 150 is rotated, it is also slid within the spiral track 184 pulling the bushing 179 and the entire second assembly 162 toward the first assembly 112 in a transverse direction. The roll pin 150 is slid within the spiral track 184 with ease until the plurality of first hydraulic line couplers 154 makes contact with the plurality of second hydraulic line couplers 186, at which point, the handle 144 is further rotated to cause the two pluralities of hydraulic line couplers 154 and 186 to interlock. The hydraulic line couplers 154 and 186 may interlock in various ways including a locking mechanism comprising ball bearings. As FIGS. 7 and 8 illustrate, when the two assemblies 112 and 162 are completely tightened, the handle 144 of the first assembly 112 ends up in a completely downward position, 180 degrees from where it started. In this manner, the weight of the handle 144 assists in keeping the two assemblies 112 and 162 in an interlocked position since a disengagement force would have to oppose the gravitational pull. However, as mentioned before, the length or the angle of the spiral of the track 184 can vary depending on the range of rotation the handle 144 of the first assembly 112 is designed to cover. As the length of the spiral track 184 is increased, the handle 144 will have a correspondingly increased range of rotation since the roll pin 150 will be allowed to slide along a further path.

Figure 10:
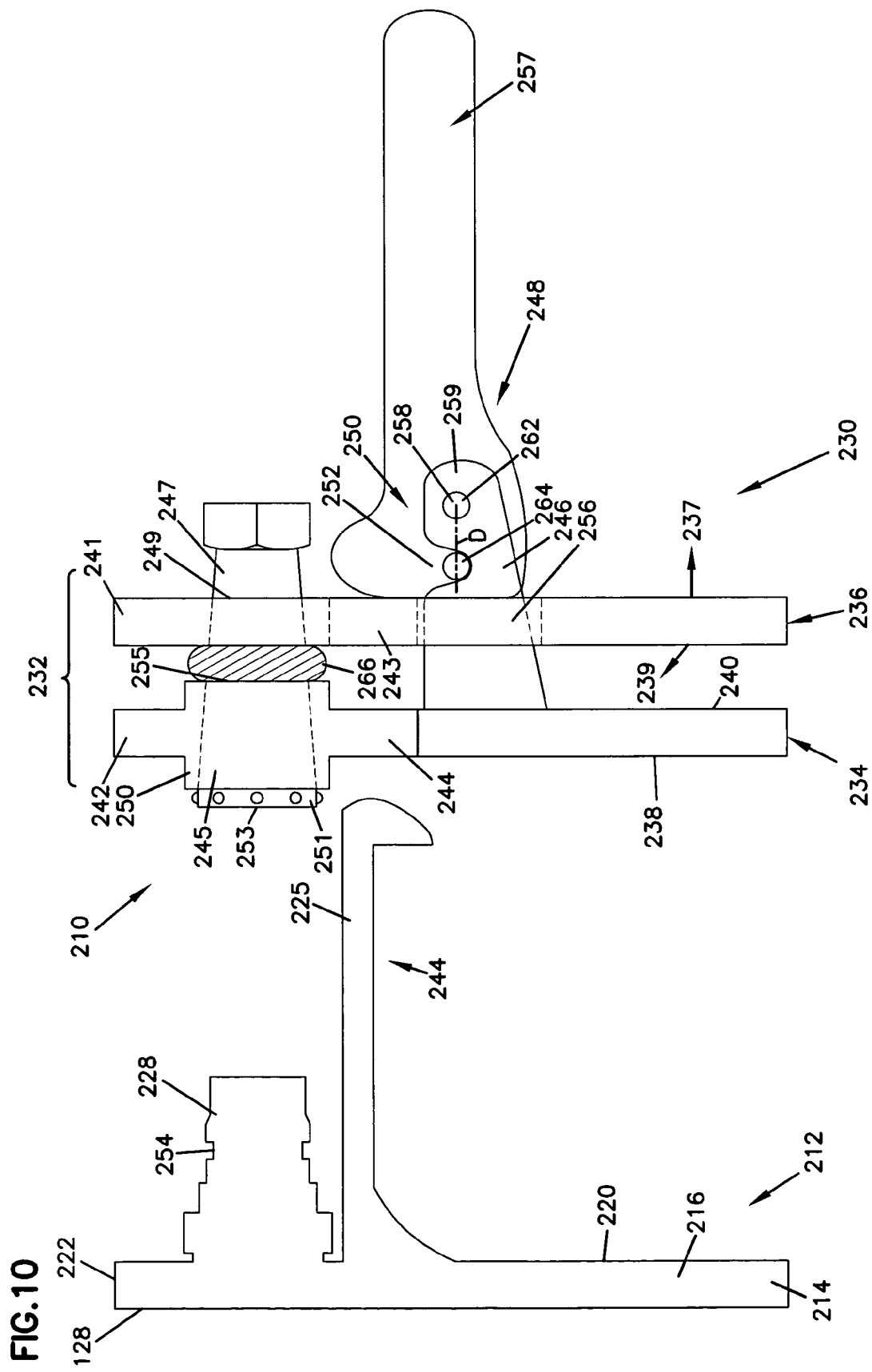
FIG. 10 is a diagrammatic view of an alternative embodiment of a hydraulic line attachment device according to the principles of the present invention.
Figure 11:
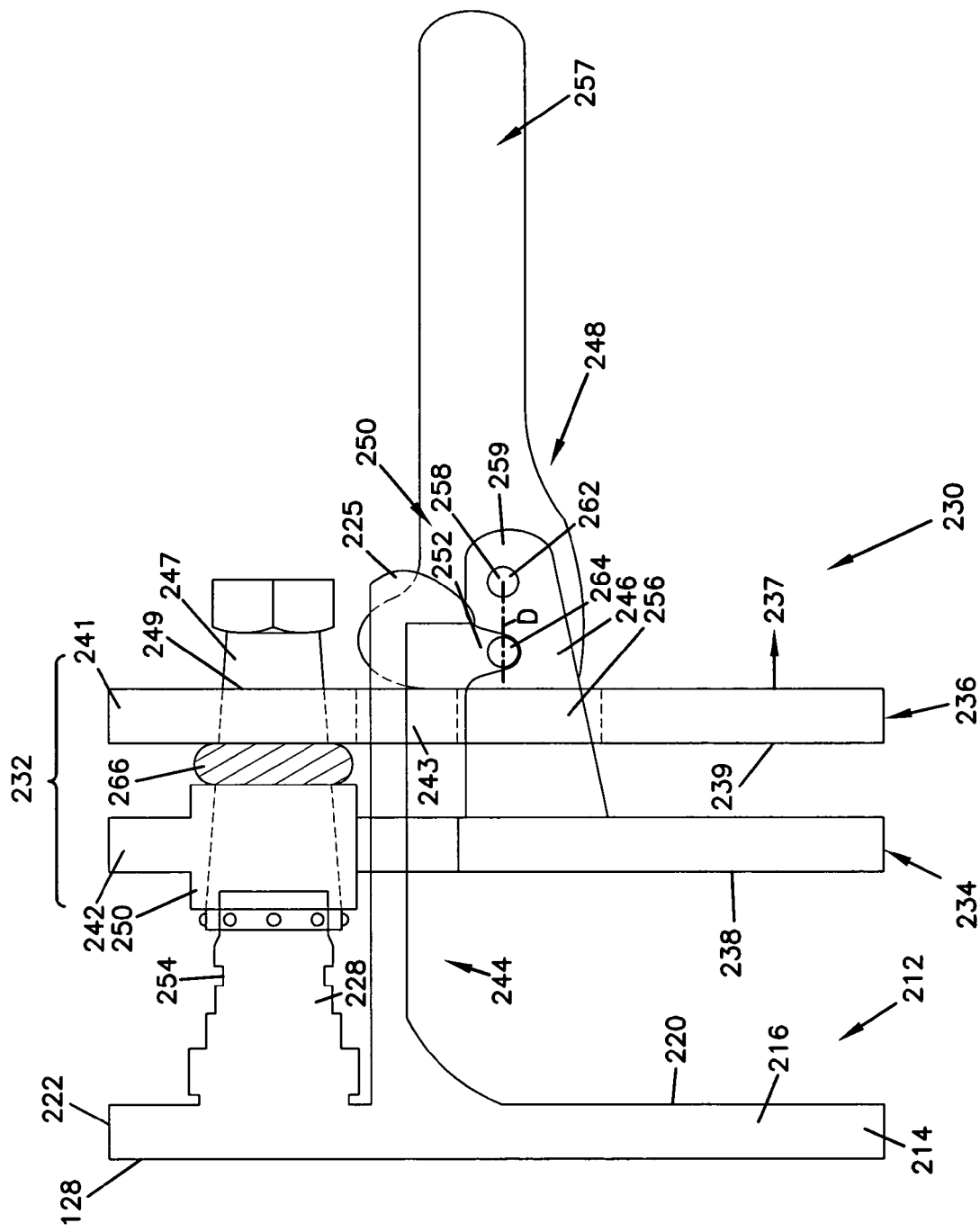
FIG. 11 is a diagrammatic view of the hydraulic line attachment device of FIG. 10 in a partially engaged position.
Figure 12:
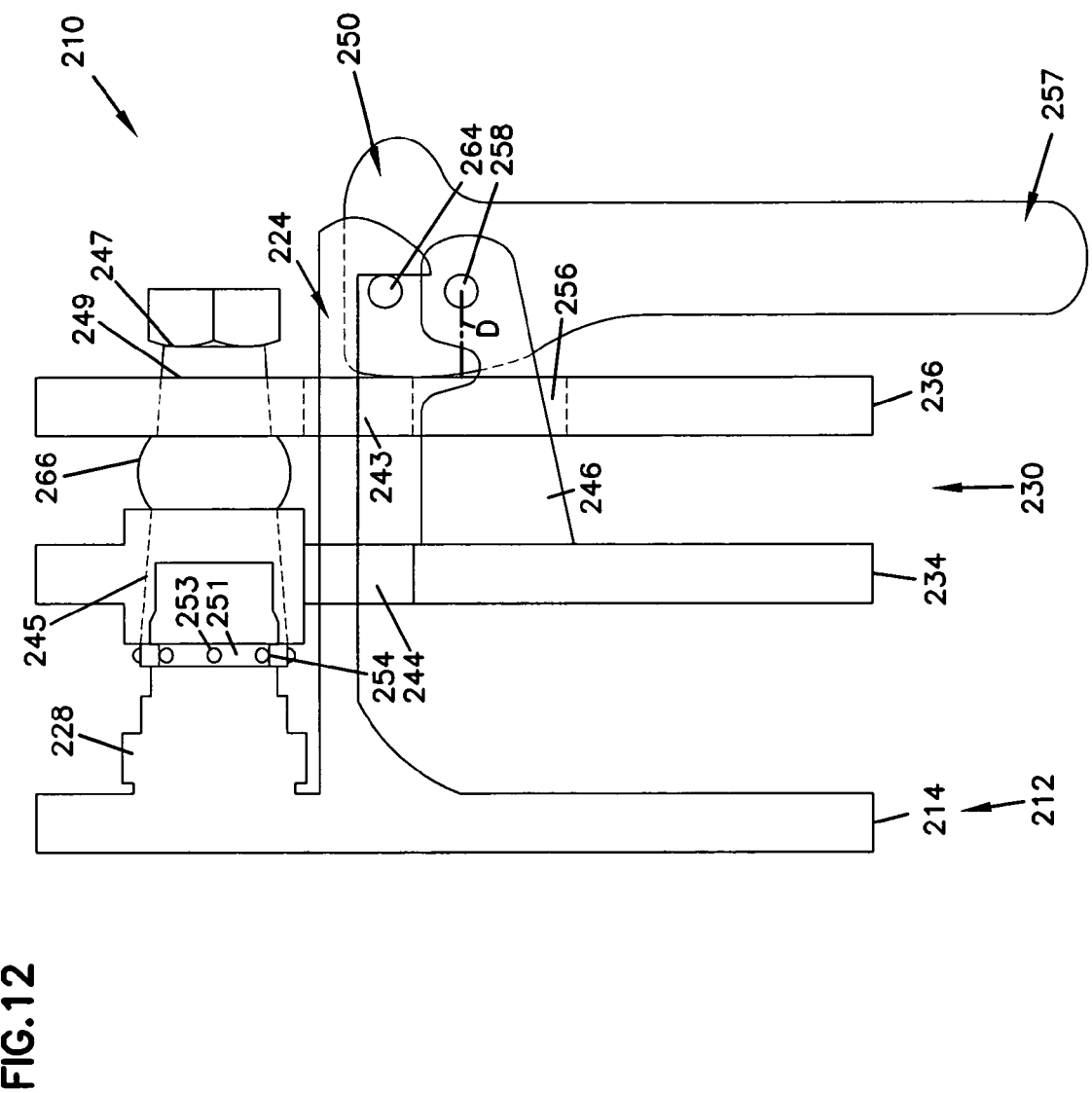
FIG. 12 is a diagrammatic view of the hydraulic line attachment device of FIGS. 10 and 11 in a fully locked position.

A diagrammatic view of another embodiment of a hydraulic line attachment device 210 according to the principles of the invention is illustrated in FIGS. 10-12.

The hydraulic line attachment device 210 includes two separate assemblies. While it should be understood that both assemblies will be able to move relative to each other, one of the assemblies may be fixedly coupled to an environment where hydraulic cylinders are found whereas the other assembly may be movable relative to such environment. It should also be understood that both assemblies may be movable relative to an environment where hydraulic cylinders are used without being fixedly coupled.

A first assembly of the hydraulic line attachment device 210 according to the invention is shown diagrammatically in FIGS. 10-12 at reference number 212. As shown in FIGS. 10 and 11, the first assembly 212 includes a first frame 214 constructed for holding a plurality of hydraulic line couplers. The first frame 214 may comprise a hook plate 216. The hook plate 216 can be manufactured out of any metal. While the hook plate 216 can have any cross-sectional shape such as a rectangle, circle, triangle, or any other polygon as was discussed for the hydraulic line attachment device 110 according to the invention. The hook plate 216 includes an outer surface 218 and an inner surface 220. The two surfaces 218 and 220 are separated by a wall 222 of certain thickness. The thickness of the wall 222 can vary depending on the application for which it is used. The first assembly 212 may also include a bracket for attaching the first assembly to an environment where hydraulic cylinders are used, as previously discussed for the hydraulic line attachment device 110. The bracket may comprise any structure coupled to the first assembly 212 configured to be used to attach the first assembly 212 to an environment where hydraulic cylinders are used.

The first assembly 212 also includes a first coupling member 224. The first coupling member 224 comprises an arm 226 depicted as a solid hook member coupled to the first frame 214. The hook member 226 extends out from the inner surface 220 of the hook plate 216. The hook member 226 can be manufactured out of any metal and can be coupled to the hook plate 216 in a number of ways including welding, threading and etc.

As shown diagrammatically in FIGS. 10-12, the first assembly 212 includes a plurality of first hydraulic line couplers, collectively represented by the reference number 228. The first hydraulic line couplers 228 extend out from the inner surface 220 of the plate 216. Although illustrated as male couplers in FIGS. 10-12, as previously discussed for the hydraulic line attachment device 110, the plurality of first hydraulic line couplers 228 can also be female couplers. Moreover, although only one hydraulic line coupler 228 illustrated in FIGS. 10-12 for diagrammatic purposes, the number of the first hydraulic line couplers 228 can vary depending on the application the hydraulic lines are used for, as previously discussed for the hydraulic line attachment device 110. The first hydraulic line couplers 228 are adapted to communicate with hydraulic line fittings through the wall 222 as previously discussed for the hydraulic line attachment device 110.

A second assembly of the hydraulic line attachment device 210 according to the invention is shown diagrammatically in FIGS. 10-12 at reference numeral 230. As shown diagrammatically in FIGS. 10-12, the second assembly 230 includes a second frame 232 constructed for holding a plurality of hydraulic line couplers. The second frame 232 may comprise a pivot plate 234 and a cam plate 236. The pivot plate 234 and the cam plate 236 can be manufactured out of any metal. The pivot plate 234 and the cam plate 236 can have any cross-sectional shape such as a rectangle, circle, triangle, or any other polygon, as was mentioned for the first assembly 212. The second assembly 230 may also include a bracket for attaching the second assembly to an environment where hydraulic cylinders are used, as discussed for the first assembly 212. The bracket may comprise any structure coupled to the second assembly 230 configured to be used to attach the second assembly 230 to an environment where hydraulic cylinders are used.

The cam plate 236 includes an outer surface 237 and an inner surface 239. The two surfaces 237 and 239 are separated by a wall 241 of certain thickness. The thickness of the wall 241 can vary depending on the application for which it is used. The wall 241 of the cam plate 236 includes a slot 243 extending therethrough configured to receive the hook member 226 of the first assembly 212. The cam plate 236 also includes a plurality of second hydraulic line couplers, collectively represented by the reference number 245. The second hydraulic line couplers 245 extend out from the inner surface 239 of the cam plate 236. Although illustrated as female couplers in FIGS. 10-12, as discussed for the hydraulic line attachment device 110, the plurality of second hydraulic line couplers 245 can also be male couplers, the orientation of the first hydraulic line couplers 228 and the second hydraulic line couplers 245 being interchangeable. Moreover, although only one hydraulic line coupler 245 is illustrated in FIGS. 10-12 for diagrammatic purposes, the number of the second hydraulic line couplers 245 can vary depending on the application the hydraulic lines are used for, as previously discussed for the first assembly 212.

The cam plate 236 of the second assembly 230 also includes hydraulic line fittings 247 located on the opposite side of the wall 241 from the plurality of second hydraulic line couplers 245. The plurality of second hydraulic line couplers 245 of the second assembly 230 communicates with the hydraulic line fittings 247 through holes 249 extending through the wall 241 of the cam plate 236.

The plurality of second hydraulic line couplers 245 of the second assembly, depicted diagrammatically as female couplers, comprise conventional ball bearing assemblies 251 that comprise locking balls 253 that are configured to provide an interlocking arrangement with the first hydraulic line couplers 228, depicted diagrammatically as male couplers in FIGS. 10-12.

The locking balls 253 are constructed to move radially around the perimeter of the female couplers when the female couplers engage male couplers. As diagrammatically illustrated in FIGS. 10-12, the locking balls 253 are adapted to fit into a slot 254 located around the perimeter of the male couplers 228 of the first assembly 212 when the two sets of couplers are engaged. The ball bearing locking arrangement 251 is only one example of the types of locking arrangements used to connect hydraulic lines. Other types of arrangements are commonly known in the art and can be used according to the principles of the invention without departing from the spirit and scope.

The pivot plate 234 of the second assembly 230 includes an outer surface 238 and an inner surface 240. The two surfaces 238 and 240 are separated by a wall 242 of certain thickness. The thickness of the wall 242 can vary depending on the application for which it is used. The wall 242 of the pivot plate 234 includes a slot 244 extending therethrough configured to receive the hook member 226 of the first assembly 212. The wall 242 of the pivot plate also includes a hole 255 extending therethrough configured to receive through it the second hydraulic line coupler 245 that is fixedly coupled to the cam plate 236.

The pivot plate 234 comprises a pivot anchor 246 fixedly coupled to the pivot plate 234. The pivot anchor 246 extends out from the inner surface 240 of the pivot plate 234. The pivot anchor 246 can be manufactured out of any metal and can be coupled to the pivot plate 234 in a number of ways including welding, threading and etc.

The pivot anchor 246 is configured to be received through a hole 256 extending through the wall 241 of the cam plate 236. The pivot anchor 246 comprises a pivot end 259. The pivot anchor 246 includes a hole 262 adjacent the pivot end 259 constructed for receiving a pivot pin 258. The pivot anchor 246 also includes a sideslot 252 configured to accept a locking pin 264.

The pivot plate 234 also comprises a collar portion 260 shaped as a hollow cylindrical tubular sleeve that extends out from the outer surface 238 as illustrated in FIGS. 10-12. The collar portion 260 can be manufactured out of any metal. The collar portion can be coupled to the pivot plate 234 in a number of ways including welding, threading and etc. The collar portion is positioned on the pivot plate 234 such that it lies over the hole 255 constructed to receive the second hydraulic line coupler 245.

The second assembly 230 also includes a second coupling member 248. The second coupling member 248 comprises a cam 250 depicted as including a handle 257. The cam 250 is constructed to be coupled to the pivot anchor 246 by way of a pivot pin 258 that extends through the hole 262 located adjacent the pivot end 259 of the pivot anchor 246. The pivot pin 258 allows the cam 250 to be rotatably fixed to the pivot anchor 246.

The cam 250 also includes a locking pin 264 configured to be used to engage the hook member 226 after the hook member 226 has been inserted through the slot 244 of the pivot plate 234 and the slot 243 of the cam plate, respectively. The locking pin 264 of the cam 250 is constructed to rest in the sideslot 252 of the pivot anchor 246 when the cam 250 is in an unlocked position as seen diagrammatically in FIGS. 10 and 11.

The second assembly 230 also includes a spring member 266 positioned between the pivot plate 234 and the cam plate 236. The spring member 230, although depicted as an elastomeric member, can be constructed of any configuration or material adapted to provide a separation force on the pivot and cam plates 234, 236, to cause relative separation of the two plates.

As mentioned for the hydraulic line attachment device 110, at least one of the first assembly 212 and the second assembly 230 of the hydraulic line attachment device 210 may comprise a housing for receiving the other of the first assembly 212 and the second assembly 230 therein, wherein the housing is used for the purpose of concealing and providing protection for the hydraulic line couplers of the hydraulic line attachment device 210.

In using the hydraulic line attachment device 210 for attaching hydraulic lines together 210, the hook member 226 of the first assembly 212 is first inserted through the slots 244, 243 on the walls 242, 241 of the pivot plate 234 and the cam plate 236, respectively. In this manner, the hook member 226 is used to align the plurality of first hydraulic line couplers 228 of the first assembly 212 with the plurality of second hydraulic line couplers 245 of the second assembly 230. As the hook member 226 is inserted through the slots 244 and 243, the first hydraulic line couplers, depicted as male couplers 228, start to enter into the second hydraulic line couplers, depicted as female couplers 245. Thereafter, the cam 250 is rotated about the pivot pin 258 with the use of the handle 257 such that the locking pin 264 catches the hook member 226 to pull the female couplers 245 further onto the male couplers 245 such that the locking balls 253 of the second hydraulic line couplers 245 fit within the slot 254 of the male couplers 228. The locking balls 253, as previously mentioned, are constructed to radially move in the outwardly direction and then in the inwardly direction to fit within the slot 254 as the female couplers 245 are brought over the male couplers 228. The cam 250 is illustrated in an unlocked position in FIGS. 10 and 11 and is illustrated in a locked position in FIG. 12 after having been rotated about pivot pin 258.

The rotation of the cam 250 about the pivot pin 258, also, at the same time as pulling the first assembly 212 toward the second assembly 230, allows the pivot plate 234 and the cam plate 236 to separate apart because of the spring force provided by the spring member 266. The relative movement between the pivot plate 234 and the cam plate 236 brings the collar portion 260 of the pivot plate 234 over the locking balls 253 to capture the locking balls 253 within the slot 254 in the male couplers 228, as shown in FIG. 12. In this manner, the female coupler 245 is fully locked around the male coupler 228. The locking balls 253 are prevented from moving radially outwardly to disengage from the slot 254 because of the collar portion 260 of the pivot plate 234.

The rotation of the cam 250 allows the two plates 234 and 236 to separate from each other because of the shape of the cam 250. The cam 250 is shaped such that the distance D between the pivot pin 258 and the outer surface 237 of the cam plate 236 is initially longer when the cam 250 is in an unlocked position, as shown in FIG. 10, than when it is in a locked position, as shown in FIG. 12. When the cam 250 is rotated to a locked position as seen in FIG. 12, the amount the distance D between the pivot pin 258 and the outer surface 237 of the cam plate 236 is decreased in the same amount the distance between the two plates 234 and 236 is increased when the two plates are separated from each other due to the spring force provided by the spring member 266. The collar portion 260 of the pivot plate 234, moving with the plate, therefore, is brought over the locking balls 253 of the female coupler 245 to capture the locking balls 253 within the slot 254 around the male coupler 228.

The rotation of the cam 250 also causes the hook plate 216 to be pulled toward the second assembly 230 due to the shape of the cam 250. The locking pin 264, initially positioned inside the sideslot 252 of the pivot anchor 246 between the pivot pin 258 and the outer surface 237 of the cam plate 236, is rotated away from the outer surface 237 of the cam plate 236, thereby, contacting and pulling the hook member 226 of the first assembly 212 toward the second assembly 230. In this manner, the rotation of the cam 250 simultaneously causes a relative movement between the two assemblies 212 and 230 and a relative movement between the pivot plate 234 and the cam plate 236 of the second assembly 230 to attach and fully lock hydraulic lines together.

As FIGS. 10-12 illustrate, when the two assemblies 212 and 230 are completely tightened, the handle 257 coupled to the cam 250 ends up in a completely downward position, approximately 90 degrees from where it started. In this manner, the weight of the handle 257, along with the spring force provided by the spring member 266 against the plates 234 and 236, assists in keeping the two assemblies 212 and 230 in an interlocked position.

The above specification, examples and data provide a complete description of the manufacture and use of the composition of the invention. Since many embodiments of the invention can be made without departing from the spirit and scope of the invention, the invention resides in the claims hereinafter appended.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A hydraulic line attachment device comprising:
   (a) a first assembly comprising a first frame, a plurality of first hydraulic line couplers, and a first coupling member;
   (b) a second assembly comprising a second frame, a plurality of second hydraulic line couplers, and a second coupling member;
   (c) the plurality of first hydraulic line couplers and the plurality of second hydraulic line couplers are constructed so that they are closed to flow of hydraulic fluid therethrough when disengaged, and open to flow of hydraulic fluid there through when engaged;
   (d) at least one of the first coupling member and the second coupling member comprises a shaft having a pin, the shaft being constructed to engage the other of the first coupling member and the second coupling member, and wherein the other of the first coupling member and the second coupling member comprises a cam comprising a cylinder and a spiral track for engaging the pin, wherein the cam engages the shaft and the pin so that as a result of rotation between the shaft and the cam when the pin is engaged in the spiral track, the plurality of first hydraulic line couplers and the plurality of second hydraulic line couplers are engaged or are disengaged depending on the direction of rotation; and
   (e) a handle coupled to one of the first coupling member or the second coupling member so that moving the handle causes engagement and disengagement of the plurality of first hydraulic line couplers and the plurality of second hydraulic line couplers when the pin is engaged in the spiral track, and wherein the handle is constructed to rotate in a plane perpendicular to an axis of movement of the plurality of first hydraulic line couplers and the plurality of second hydraulic line couplers when moving into or out of engagement, and wherein the plane crosses the axis.

2. A hydraulic line attachment device according to claim 1, wherein at least one of the first assembly and the second assembly is attached to a motor vehicle, and wherein the other of the first assembly and the second assembly is coupled to hydraulic lines attached to a front-end loader.

3. A hydraulic line attachment device according to claim 1, wherein each frame is constructed for holding at least four hydraulic line couplers.

4. A hydraulic line attachment device according to claim 1, wherein the handle causes the shaft to rotate within the cylinder.

5. A hydraulic line attachment device according to claim 1, wherein the plurality of first hydraulic line couplers are constructed to interlock with the plurality of second hydraulic line couplers by a ball bearing arrangement.

6. A hydraulic line attachment device according to claim 1, wherein at least one of the first assembly or the second assembly comprises a bracket for attaching to a motor vehicle.

7. A method for using a hydraulic line attachment device, the method comprising:
   (a) engaging a plurality of first hydraulic line couplers to a plurality of second hydraulic line couplers to provide flow of hydraulic fluid through the plurality of first hydraulic line couplers and the plurality of second hydraulic line couplers for powering at least one hydraulic cylinder, wherein:
      (i) a first assembly comprises a first frame, the plurality of first hydraulic line couplers, and a first coupling member, and a second assembly comprises a second frame, the plurality of second hydraulic line coupler, and a second coupling member;
      (ii) at least one of the first coupling member and the second coupling member comprises a shaft having a pin, and the other of the first coupling member and the second coupling member comprises a cylinder and a spiral track within the cylinder so that the shaft engages the cylinder and the pin engages the spiral track, and rotation between the shaft and cylinder, when the pin is engaged with the spiral track, causes the plurality of first hydraulic line couplers and the plurality of second hydraulic line couplers to move toward or away from each other depending on the direction of rotation;
      (iii) a handle coupled to one of the first coupling member or the second coupling member so that rotating the handle in a first direction causes engagement of the plurality of first hydraulic line couplers and the plurality of second hydraulic line couplers; and
   (b) disengaging the plurality of first hydraulic line couplers from the plurality of second hydraulic line couplers by rotating the handle in a direction reverse to the first direction.

8. A method according to claim 7, wherein the first direction and the direction reverse to the first direction are in a plane perpendicular to an axis of movement of the plurality of first hydraulic line couplers and the plurality of second hydraulic line couplers when moving into or out of engagement.

9. A method according to claim 8, wherein the plane crosses the axis.

10. A method according to claim 7, wherein the plurality of first hydraulic line couplers are attached to hydraulic lines containing hydraulic fluid therein, and the plurality of second hydraulic line couplers are attached to hydraulic lines containing hydraulic fluid therein.

11. A method according to claim 10, wherein the step of engaging comprises overcoming the weight of the hydraulic fluid in the hydraulic lines.

12. A method according to claim 7, wherein at least one of the first assembly and the second assembly is attached to a motor vehicle, and wherein the other of the first assembly and the second assembly is coupled to hydraulic lines attached to a front end loader.

13. A method according to claim 7, wherein the plurality of first hydraulic line couplers are constructed to interlock with the plurality of second hydraulic line couplers by a ball bearing arrangement.

14. A method according to claim 7, further comprising:
(a) flowing hydraulic fluid through the plurality of first hydraulic line couplers and the plurality of second hydraulic line couplers for moving hydraulics cylinders after the step of engaging and before the step of disengaging.

* * * * *

INTER PARTES REEXAMINATION CERTIFICATE (1146th)
United States Patent
Langenfeld et al.

(10) Number: US 8,007,010 C1
(45) Certificate Issued: *Jul. 17, 2015

(54) HYDRAULIC LINE ATTACHMENT DEVICE AND METHOD

(76) Inventors: Joseph W. Langenfeld, Onawa, IA (US); Matthew N. Westendorf, Onawa, IA (US); Neal W. Westendorf, Dakota Dunes, SD (US); James Curtis Stender, Schleswig, IA (US); Mitch Gibler, Onawa, IA (US)

Reexamination Request:
No. 95/002,139, Sep. 5, 2012

Reexamination Certificate for:
Patent No.: 8,007,010
Issued: Aug. 30, 2011
Appl. No.: 12/658,574
Filed: Feb. 4, 2010

(*) Notice: This patent is subject to a terminal disclaimer.

Related U.S. Application Data

(62) Division of application No. 11/397,863, filed on Apr. 3, 2006, now Pat. No. 7,717,471, which is a division of application No. 10/773,566, filed on Feb. 6, 2004, now Pat. No. 7,021,668.

(51) Int. Cl.
*F16L 35/00* (2006.01)
*E02F 3/36* (2006.01)
*E02F 9/22* (2006.01)
*F16L 37/56* (2006.01)

(52) U.S. Cl.
CPC ............ *E02F 3/3654* (2013.01); *E02F 9/2275* (2013.01); *F16L 37/56* (2013.01); *Y10T 137/0402* (2015.04); *Y10T 403/7007* (2015.01)

(58) Field of Classification Search
None
See application file for complete search history.

(56) References Cited

To view the complete listing of prior art documents cited during the proceeding for Reexamination Control Number 95/002,139, please refer to the USPTO's public Patent Application Information Retrieval (PAIR) system under the Display References tab.

*Primary Examiner* — Joseph Kaufman

(57) ABSTRACT

A hydraulic line attachment device is provided. The hydraulic line attachment device comprises a first assembly comprising a first frame constructed for holding a plurality of first hydraulic line couplers and a first coupling member; and a second assembly comprising a second frame constructed for holding a plurality of second hydraulic line couplers and a second coupling member constructed to engage the first coupling member and align the plurality of first hydraulic line couplers with the plurality of second hydraulic line couplers. At least one of the first coupling member and the second coupling member comprises an arm constructed to engage at least one of the first frame and the second frame and engage the other of the first coupling member and the second coupling member. The other of the first coupling member and the second coupling member comprises a cam that engages the arm to provide tightening of the first assembly relative to the second assembly. A method for using a hydraulic line attachment device is provided.

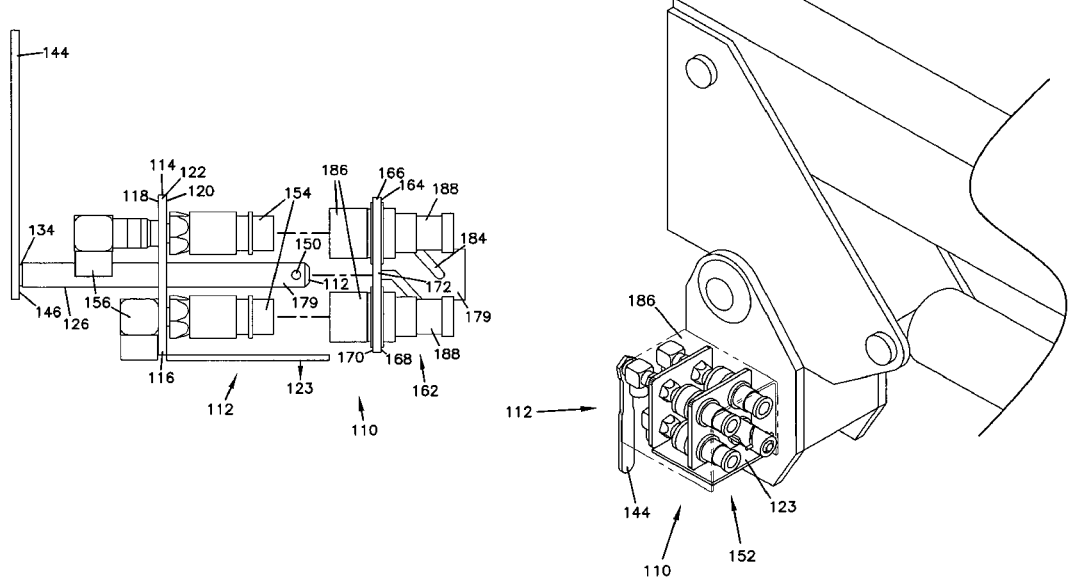

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *